July 13, 1965  H. H. HARMS  3,194,399
SUCTION FILTER APPARATUS
Filed May 17, 1961  5 Sheets-Sheet 1

INVENTOR:
HAROLD H. HARMS.
BY
Hugh A Kirk
ATTY.

July 13, 1965    H. H. HARMS    3,194,399
SUCTION FILTER APPARATUS
Filed May 17, 1961    5 Sheets-Sheet 2

INVENTOR:
HAROLD H. HARMS.
BY
Hugh A. Kirk
ATTY.

FIG-11

United States Patent Office

3,194,399
Patented July 13, 1965

3,194,399
SUCTION FILTER APPARATUS
Harold H. Harms, Toledo, Ohio, assignor to Henry Manufacturing Co., Inc., Bowling Green, Ohio, a corporation of Ohio
Filed May 17, 1961, Ser. No. 110,790
28 Claims. (Cl. 210—104)

This invention relates to filtering apparatus and is particularly directed to induced flow filters which remove particles from a liquid, such as cuttings or swarf from cooling liquids or coolants so these liquids may be recirculated through cutting or grinding machines.

It is an object of this invention to provide a simple, reliable, efficient, effective and economic suction filter apparatus which removes both heavier and lighter particles from a liquid, without the addition of outside filter media.

Another object of this invention is to provide filtering apparatus with means to increase the flow of liquid while permitting the use of finer screening means than heretofore possible in gravity flow filters.

Another object of the invention is to provide filtering apparatus with means to automatically intermittently remove swarf from the filtering screen at pre-set intervals, which automatic means may be overruled in the event liquid flow decreases a predetermined amount or below a normal rate.

Another object is to provide a self-cleaning and a non-vapor locking suction filtering means.

Another object is to provide improved mounting means for the filtering screens.

Still another object is to provide improved conveyor means whereby removal of swarf is facilitated and jamming is avoided.

Generally speaking, the system or apparatus of the present invention comprises: a first reservoir means, into which particle containing or dirty liquid to be cleaned is discharged, having screening means on which a filter bed or mat is built up by said particles as the dirty liquid is forced by pressure through the screening means; a second reservoir means into which filtered or clean liquid is delivered and from which clean liquid is removed; timer means periodically to stop the forcing pressure and activate a cleaning means for the screening means to remove a portion of the mat thereon; and/or means responsive to a predetermined decrease in the liquid flow through said screening means to override said timer means to stop said forcing pressure and start said cleaning means to remove a part of said mat from said screening means to increase the flow of liquid through the apparatus.

Separation of the particles lighter than the liquid to be cleaned, such as tramp oils in coolants from machine tools which trap buoyant fines and any other floating debris or flotsam, may be accomplished in the first reservoir means by the velocity of the incoming coolant which is diffused across the surface of the liquid and driven to a sloping or inclined discharge end of the first reservoir means for accumulation and removal by a conveyor.

Progressive filtering of the remaining and/or heavier particles in the liquid to be cleaned is accomplished near the bottom of the first reservoir means by the formation of the filter mat or bed, such as of swarf, grindings and/or machining chips, on the upper surface of a screen which progressively produces a finer and finer degree of filtration. This screen may be of sintered metal or of the non-clogging type, through which the dirty liquid to be cleaned is induced to flow by a suction pump which also delivers the filtered or clean liquid to the second reservoir means or clean tank. The cleaning means may comprise a conveyor with flexible screen scraping flights which are inched intermittently across this screen to prevent the filter bed from becoming too thick and to progressively advance the mat or bed toward the discharge or ramp end of the first reservoir means for removal from the apparatus. This screen also may be inclined from the horizontal in this first reservoir or filter tank and the suction pump intake located just below its higher end to prevent the formation of air pockets or bubbles under the screen which reduce the suction and liquid flow through the apparatus.

The clean tank or second reservoir means is normally located alongside the first reservoir means and into it the pump discharges filtrate at a point below the normal liquid level or adjacent the bottom thereof to prevent entrapment of air in the pump when it stops. A clean liquid removal pump may be mounted in this second or clean reservoir to supply clean liquid, or coolant to the machine tool. The normal liquid level in the clean tank is preferably above that in the filter tank so that return flow, such as over a weir, is from the second reservoir or clean tank to the first reservoir or filter tank so that filtrate becomes increasingly clarified during recirculation as well as to prevent flotsam from flowing into the clean tank to contaminate or clog it. Also if desired, a manually opened by-pass from the clean liquid removal pump outlet may be provided for cleaning fine particles from the compartment below the screen in the first reservoir. When settling of the clean liquid is desirable, a conveyor similar to that provided in the first reservoir means may be employed to scrape the bottom of the second reservoir means or clean tank and to discharge such settlings from a similar ramp discharge end thereof.

Control means provides a screen cleaning cycle consisting of stopping the pump, and then, preferably after a slight delay to break the suction on the filter screen, activating the screen scraping conveyor for an adjustable predetermined length of time depending on the properties of the liquid to be cleaned, the suction pressure, and type of screening means. Also the screen scraping conveyor or cleaning cycle may be automatically controlled by a timer and/or in response to variations in the flow of the liquid through the apparatus, for which dual means have been provided, either or both of which may be used to operate alone or to overrule the normal periodic cleaning cycle in the event the filtrate flow decreases beyond an adjustable predetermined limit prior to the initiation of the pre-set timed cleaning cycle. One such flow control means includes a vacuum switch activated by increased vacuum in the pump intake pipe due to decrease in liquid flow from the screening means. The other consists of a float actuated switch open during the normal filtering cycle and closed in response to a slight drop in the rate of incoming liquid to the second reservoir means or clean tank due to a decrease in liquid flow through the filtering means. A float chamber having an adjustable overflow is mounted in the second reservoir or clean tank and is directly connected to the discharge end of the suction pump outlet so as always to receive a portion of the flow therefrom and to be refilled rapidly after the cleaning cycle to raise the float without awaiting the refilling of the clean tank (as heretofore the ordinary practice for float controls). After completion of each cleaning cycle, each control means resets the timer for timing the next cleaning cycle.

The above mentioned and other features and objects of this invention and the manner of attaining them will become more apparent and the invention itself will be best understood by reference to the following description of embodiments of the invention taken in conjunction with the accompanying drawings, wherein.

Referring to the drawings in detail, there are shown embodiments of filtering apparatus according to this invention through which a liquid containing particles is cleaned, or has said particles removed therefrom for recirculation of said liquid in a system, such as a system for a liquid coolant from a machine tool 15 which coolant becomes contaminated and dirty at the machine 15 and is circulated therefrom through the inlet duct or pipe 16 to the filtering apparatus of this invention to be cleaned and recirculated to the machine 15 through return or outlet duct or pipe 17. As particularly shown in FIGS. 1, 2, 3 and 9 the apparatus may comprise a single large tank 20 divided longitudinally by a partition 21 into two reservoirs 22 and 23, into the first of which (reservoir 22) the liquid to be cleaned or filtered is introduced through inlet pipe 16. As the dirty liquid or coolant enters the reservoir 22 it is directed onto diffuser plate 24, shown at the right end of the reservoir 22 in FIGS. 1 and 9, which spreads the liquid over the operating liquid level or surface 25 in the reservoir 22 and directs it toward the discharge or ramp 26 shown at the left end of the reservoir in FIGS. 2 and 9. The velocity of the incoming liquid from its inlet and the spreading action of the diffuser 24 move tramp oils, which trap buoyant fines and other floating debris or flotsam 27 (see FIG. 9), to the discharge end of the reservoir against the ramp 26. This flotsam 27 is then carried up the ramp 26 by the flights 50 of a conveyor 60 together with the filtered out swarf 31 scraped from off the filtering means 30 below the level 25 of liquid in the filtering reservoir 22, and removed from the filter apparatus. This diffuser 24 (see FIG. 9) may be provided with a buoyant chamber 28 beneath its liquid spreading deflecting, or diffusing surface so that it will float and remain at the liquid surface in tank 22 so as to always direct the incoming dirty liquid just over said surface, and not splash it into the tank creating unnecessary foam and bubbles as might occur if the level 25 could lower below the outer edge of the diffuser 24. Rod or other guide means 29 also may be provided to extend upwardly from this floating diffuser 24 to guide it and maintain its position below the outlet of the inlet duct 16 as the diffuser raises and lowers with the changing level 25 of the liquid in the tank or reservoir 22.

(I) *Filtering means*

Figures 1, 2:
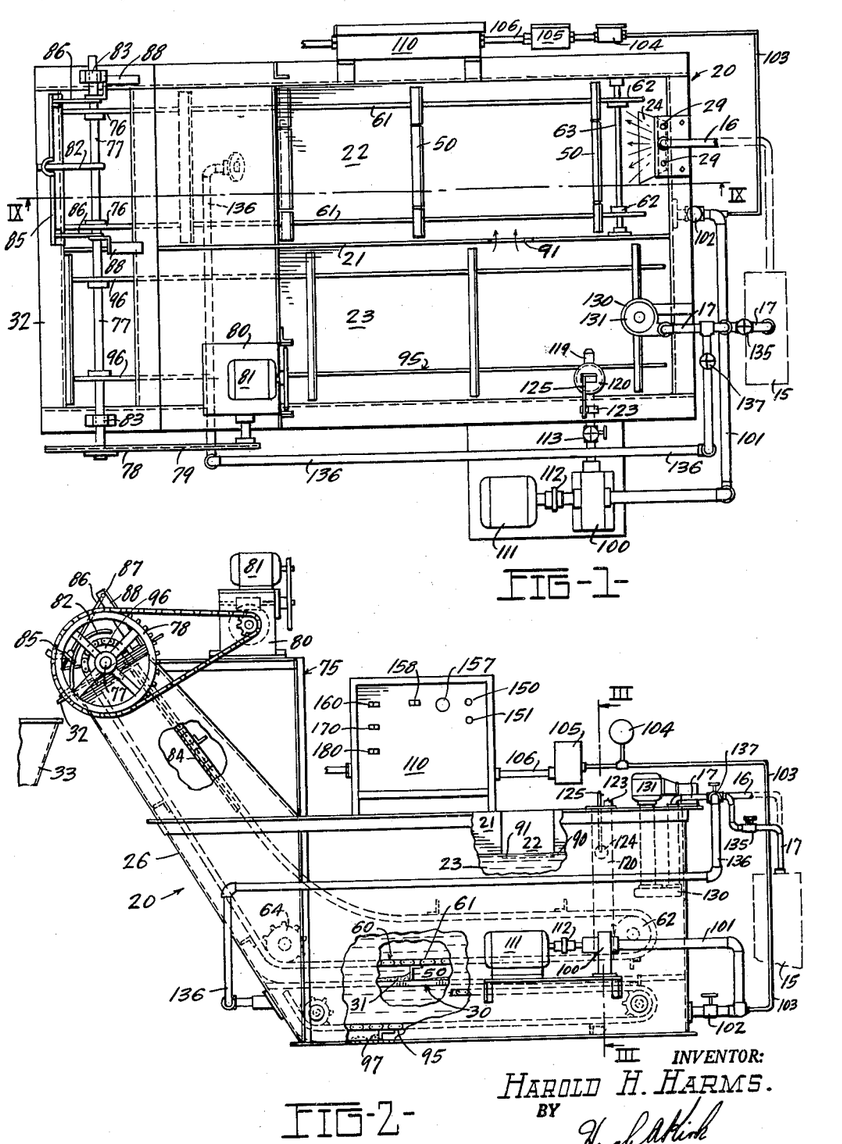
FIG. 1 is a plan view of one embodiment of the suction filter apparatus according to this invention.
FIG. 2 is a side elevational view of the apparatus shown in FIG. 1 with parts broken away.
Figure 8:
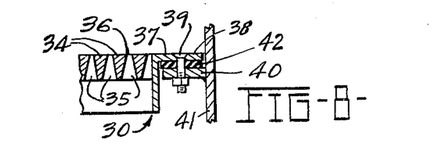
FIG. 8 is an enlarged sectional view of the mounting for the non-clogging screen shown in FIG. 3.
Figure 9:
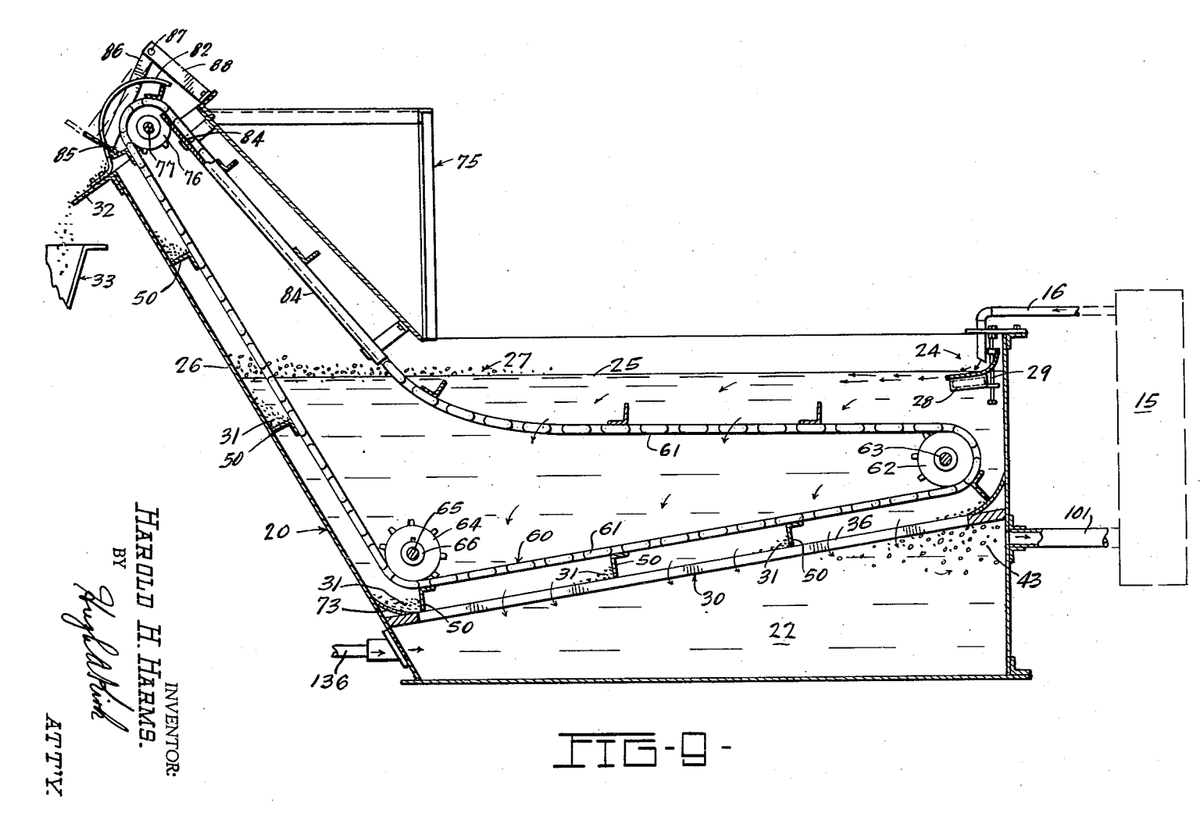
FIG. 9 is an enlarged vertical sectional view taken along line IX—IX of FIG. 1 of an apparatus similar to that in said figure showing the floating dirty liquid diffuser, but including a sloping filtering screen.

In the reservoir 22, and preferably near its bottom, is provided a filtering means or screen 30, the top of which is preferably provided with a flat surface 36, which surface is intermittently wiped by a scraper such as the flight 50 of the conveyor 60. This flight or scraper 50 also pushes the swarf 31 that accumulates on the filter screen over to the left end of the screen and then up the ramp 26 where it is drained as it is moved above the surface 25 of the liquid before being discharged over the upper edge 32 of the ramp 26, such as into a tote box 33 as shown in FIGS. 2 and 9. This filtering means 30 may comprise a non-corrosive metal screen, such as sintered metal, or a non-clogging screen of wedge shaped stainless steel bars 34 of triangular or truncated cross-section forming downwardly diverging wedge shaped slots 35 as shown in FIG. 8 to prevent clogging of particles therein once they pass through the upper surface 36. This upper surface 36 of the screen 30 is preferably made as flat as possible, such as by grinding, to insure good wiping engagement with the scrapers 50. This filtering means separates the reservoir 22 into upper and lower compartments, and said filtering means may be composed of one or more replaceable screen sections mounted or welded in a frame 37 provided with a flange 38 through which flange a countersunk screw 39 may cooperate with a flange 40 mounted on the side wall 41 of the reservoir 22. Between these flanges 38 and 40 is provided a resilient gasket 42 clamped in fluid tight relationship between the flanges so that all liquid forced by pressure from the compartment above the screen must pass through the apertures or slots 35 in the screen 30 into the compartment below the screen, and not seep with any particles therein around the edges of said screen section or sections.

In FIG. 9 the filtering means 30 is shown at an angle to the horizontal so that if any air, gas or bubbles 43 pass through the screen, they will move toward the higher side or end thereof and be removed through an adjacent suction pipe 101, and will not accumulate under the screen to cause the screen to lose its effectiveness and undesirably decrease the liquid flow rate through the apparatus.

(II) *Cleaning means*

Figure 4:
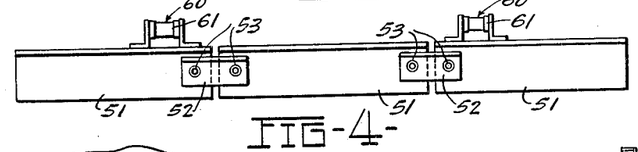
FIG. 4 is an enlarged plan view of one of the scrapers or flights of the conveyor shown in FIGS. 1, 2 or 3.
Figure 5:
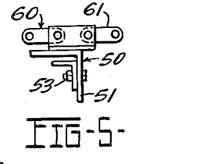
FIG. 5 is an end view of the flight shown in FIG. 4.

The scrapers 50 (see FIGS. 1 through 5, and 9, and particularly FIGS. 4 and 5) which wipe over the top surface 36 of the screen 30 may comprise one or a plurality of aligned scraping sections 51 flexibly linked together by bridging members 52 at their adjacent ends, which links 52 may be loosely attached to the scraper plates 51 by means of bolts 53 to permit as close contact as possible with the surface 36 of the screen and compensate for any irregularities which may occur in the surface 36 particularly in the case of wide screens made up of several screen sections.

Figures 6, 7:
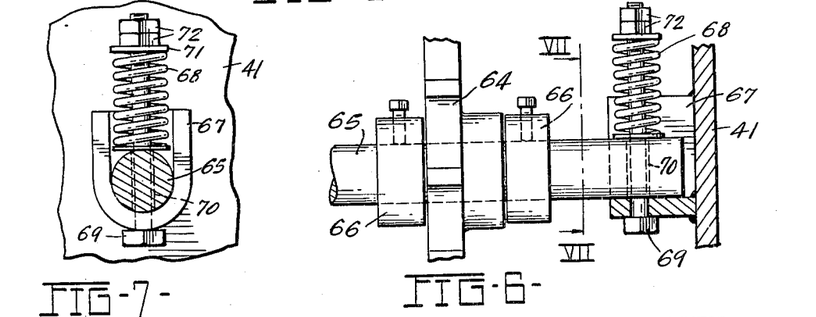
FIG. 6 is an enlarged view of the bearing supporting the sprocket wheel and its shaft at the base of the ramp or discharge end of the reservoir shown in FIGS. 1, 2 and 3, with parts broken away.
FIG. 7 is a sectional view taken along line VII—VII of FIG. 6.

These scrapers 50 may comprise flights of the conveyor 60, which conveyor may be composed of a pair of spaced parallel sprocket chains 61 operating around sprocket wheels mounted on a shaft 63 in the reservoir 22 upper compartment at its intake end. The lower run of the chain 61 may pass under an additional pair of sprocket wheels 64 (see FIGS. 2, 3 and 9) mounted on a fixed shaft 65, between a pair of fixed collars 66 which shaft 65 may be journalled in U-shaped bearings 67 at its ends mounted on walls 41 and 21 of the reservoir 22 (see FIGS. 6 and 7). These ends of the shaft 65 may be resiliently maintained in these bearings 67 by means of springs 68 mounted on bolts 69 which extend from the bottom of the bearing 67 through holes 70 in the shaft 65, springs 68, and washers 71 to a pair of locked nuts 72. These bolts 69 and springs 68 permit the shaft 65 to be raised out of the bearing 67 in the event a large piece of metal or other foreign material or debris is caught under the conveyor at the beginning of the ramp 26, thereby preventing the conveyor from being broken, jammed or bent by such foreign matter. If desired, the joint between the top surface 36 of the filtering means 30 and the inclined end or ramp 26 may be bridged with a curved plate section 73 (see FIG. 9) following the radius of the outer edge of the flights 50 to retain on said flights the swarf 31 scraped from the screen 30.

At the upper end of the ramp 26 there may be provided a frame 75 upon which may be mounted the upper and driving pair of sprocket wheels 76 for the chains 61, which wheels are keyed to a shaft 77 that may extend across the whole apparatus as shown in FIG. 1 and be driven at its far end by a larger sprocket or pulley 78 keyed by a shearable pin to said shaft 77 (also to prevent jamming) and driven by a belt or chain 79 connected to a gear box 80 driven by an electric conveyor drive motor 81. A control means for intermittently driving this motor for adjustable predetermined short periods of time (as will be described in section V later) causes the flight scrapers 50 on the conveyor to inch along the top or surface 36 of the screen means 30 and up the ramp 26 carrying the swarf 31 with them and discharging it over the upper edge 32 of the ramp into the tote box 33.

In order to reduce noise from the flights 50 after they ride off the upper end of the ramp 26, a silencing means or arcuate guide bar 82 may be provided for supporting the flights until they have passed over the top of the sprocket wheels 76 and start on their return trip back down into the upper compartment of the reservoir 22. Also as the chains 61 move around the sprockets 76 they may become loose, and adjustment means may be provided at the bearings 83 for the shaft 77 to take up this slack, but in the event such adjustments are not provided, or together therewith, there also may be provided guide strips 84 which not only support the runs of chain as they come off of the upper sprockets 76, but also extend adjacent the sprocket wheels 76 (see FIG. 9) to prevent the chains 61 from wrapping around these wheels 76, thereby insuring the proper return of the conveyor flights 50 back into the reservoir 22.

Furthermore, there also may be provided a flight scraper device 85 pivoted to links 86 that are pivoted at 87 on a rigid arm 88 mounted on the frame 75, which flight scraper device 85 rests on each flight 50 as it moves upwardly around the sprocket wheels 76 to scrape off any swarf 31 and flotsam 29 that have stuck to it.

Thus, as the swarf or heavy material accumulates upon the surface 36 of the filter means 30 by means of the pressure provided by suction of the liquid from the compartment below the filter, a mat or filter bed is built up on the filter screen 30 which as it becomes thicker causes less and less liquid to flow threthrough and filters progressively more particles from the liquid. Thus control means are provided to intermittently inch the flights 50 of the conveyor 60 along the surface 36 of the filter screen 30 to provide fresh clean surface parts on the screen 30, both to increase the liquid flow through the apparatus and to push the swarf 31 accumulated thereon across the filter and up the ramp 26 for removal as illustrated in FIGS. 2 and 9.

(III) The clean-liquid reservoir

Figure 3:
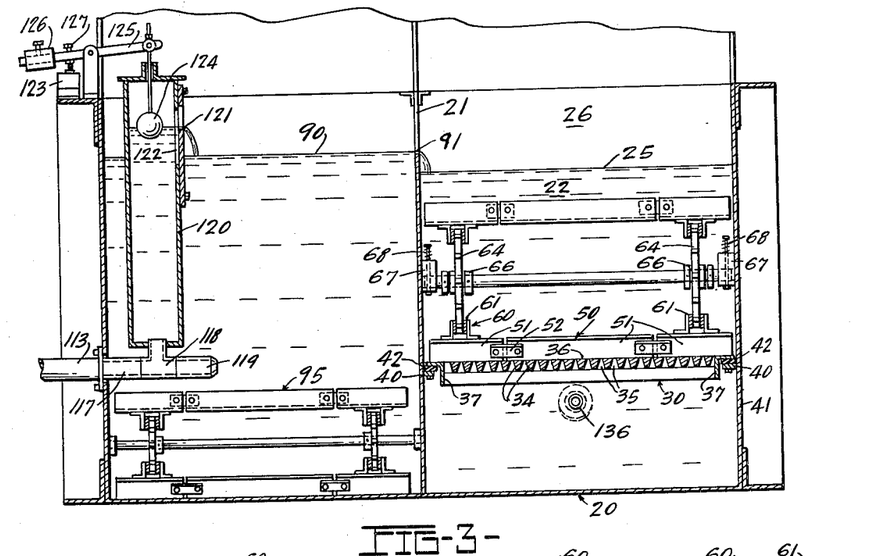
FIG. 3 is an enlarged vertical sectional view taken along line III—III of FIG. 2.

The second reservoir 23 may be provided alongside the first reservoir 22 as shown, or it may be located alone or in the rear thereof, if space requirements are critical. This second reservoir has a liquid level 90 which is above the liquid level 25 of the liquid in the reservoir 22 as shown in FIG. 3, which level differential may be limited by means of a weir notch 91 provided in the partition wall 21, so that if filtered liquid is not removed sufficiently fast from the reservoir 23, it will re-circulate back and be refiltered again in reservoir 22.

If desired, an additional conveyor 95 having scraper flights 96 which run along the bottom of the reservoir 23 may be provided, which conveyor 95 may be driven by sprockets 96 mounted on the shaft 77 shown in FIG. 1. This conveyor 95 will remove any foreign material that may accidentally fall or be thrown into the reservoir 23 as well as any settlings 97 which may not have been removed by the filter means 30. However, this additional conveyor 95 is not essential in all apparatus according to this invention and therefore often is omitted.

(IV) Liquid flow system

The means for providing a positive pressure for the liquid to be forced through the filter means 30 comprises in this embodiment a suction pump 100 (see FIGS. 1 and 2) which has it intake duct 101 connected to the compartment below the filter means 30 in reservoir 22. This duct 101 may be provided with a manual valve 102 which normally is open and a by-pass pressure line 103 to a pressure gauge 104 and pressure regulating switch means 105 which is electrically connected via conduit 106 to an electrical control panel 110, the circuits in which will be described later in section V in combination with FIGS. 10 and 11. These circuits control the stopping and starting of both the conveyor motor 81 and the suction pump motor 111 which drives through coupling 112 the pump 100. The discharge from this pump 100 is directly connected through duct 113 into the lower portion of the reservoir 23 below the level 90 of the clean liquid therein. The fact the liquid level 90 in the reservoir 23 is maintained above the level 25 in the reservoir 22, insures that, when the pump 100 is stopped, the liquid head in reservoir 23 will prevent an air lock from occuring in the pump 100 and thus always insure its proper operation, in the event air is sucked therein through and from the filter 30, because the liquid level 25 drops too low in the reservoir 22.

In operation of the filtering system of this invention, the clean liquid from the discharge of the suction pump 100 is introduced into the clean liquid reservoir 23 through extension duct 117 (see FIG. 3) to which is connected by a T junction 118 and a restricted outlet nozzle 119. A float chamber 120 is mounted above and connected to the T 118 which chamber 120 is filled to its overflow weir gate 121 prior to the filling of the reservoir or tank 23, which gate 121 is adjustable over the opening 122 in the side of chamber 120 to be higher than the level 90 of the liquid in the reservoir 23. This higher level of liquid in the chamber 120 is obtained because of the restricted orifice 119, and this higher level insures quicker and more accurate operation of the sensing switch 123 operated by the float 124 suspended in this chamber 120, unaffected by waves on the surface 90 of liquid in the tank 23. This float 124 may be mounted on a pivoted lever arm 125, which may be counterbalanced by an adjustable weight 126 and provided with an adjustable contactor 127 for operating the sensing switch 123. Thus, if the flow through the filter 30 is reduced, the pump 100 discharges less liquid and the level in the float chamber 120 will correspondingly be reduced to cause operation of the switch 123.

The re-circulation of the clean liquid or coolant from the reservoir 23 to the machine 15 may be provided by a clean liquid pump 130 which may be immersed below the surface 90 of the liquid in the clean tank or reservoir 23 and may be operated by an electric motor 131, from which pump 130 discharge duct 17 connects to the machine tool 15 or device in which the clean liquid is to be re-used before being contaminated and returned through duct 16 for refiltering. This duct 17 also may be provided with a normally open manual valve 135. Between this valve 135 and the pump 130 there may be provided a branch duct 136 which duct 136 contains a normally closed manual valve 137. This branch duct 136 extends into the lower compartment of the reservoir 22 preferably at the opposite end thereof from the suction duct 101, so that when the valve 135 is closed and valve 137 is opened, a rinsing of fines from the lower compartment of the reservoir 22 below the filter screen 30 may be made.

(V) Electrical control system

Figure 10:
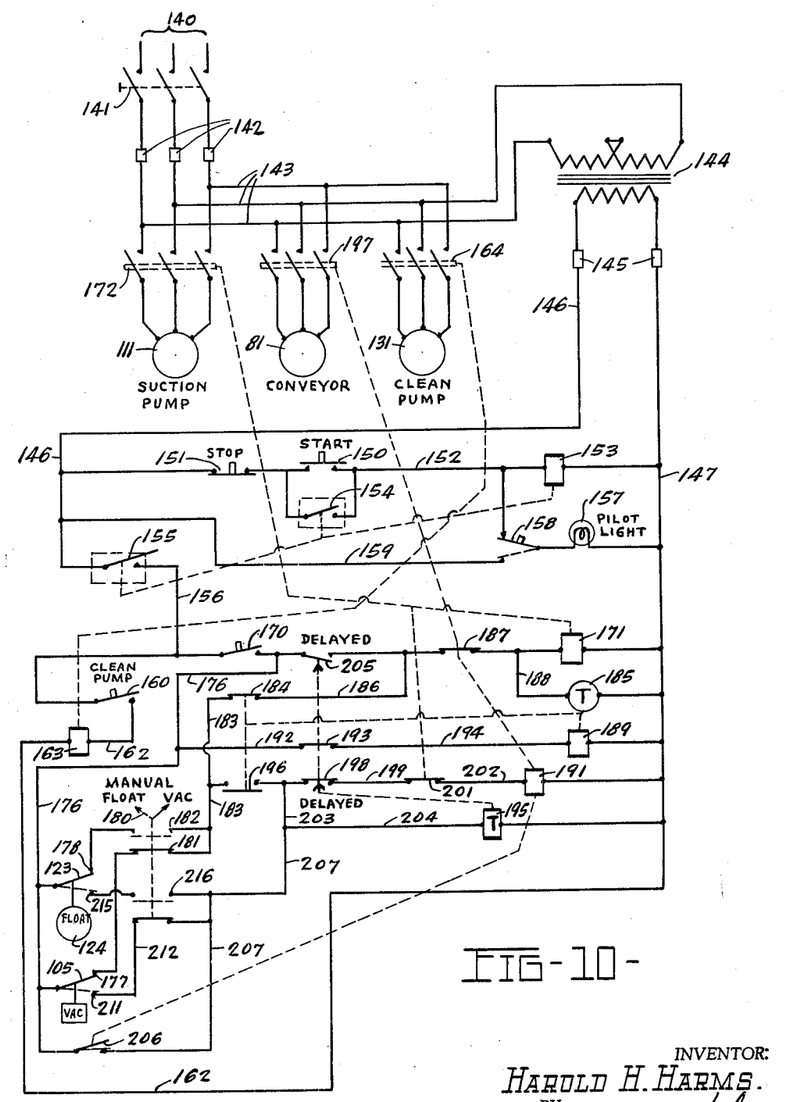
FIG. 10 is a wiring diagram of one embodiment of a control circuit for the apparatus shown in FIGS. 1, 2, 3 and 9 in which either flow control means may be employed to override the timed cleaning cycle.
Figure 11:
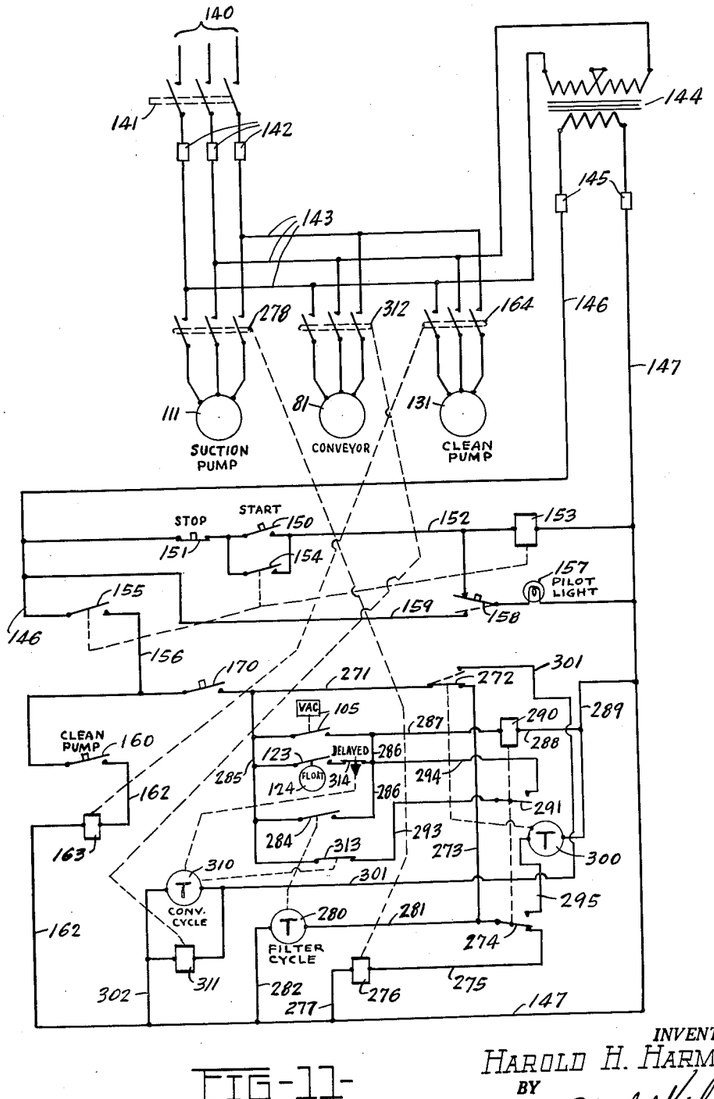
FIG. 11 is a wiring diagram of another embodiment of a control circuit for the apparatus in which both flow control means may be employed to override the timed cleaning cycle and a slight delay is provided after stopping of the suction pump before the scraper is started.

Referring now to the electrical circuit shown in FIGS. 10 and 11, a source of three phase electrical energy 140 may be controlled manually by a switch 141 to connect separate fuses 142 to the main conductors 143 to the three motors shown in the apparatus of FIG. 1, namely, the conveyor operating motor 81, the suction pump motor 111, and the clean liquid pump motor 131, respectively. Across two of these three conductors 143 there may be connected a transformer means 144 to provide current for operating the control circuit in cabinet 110 from which transformer 144 a lower voltage current may be connected through fuses 145 to main supply conductors 146 and 147 which are shown along the left and right sides, respectively, of the lower part of the diagrams of FIGS. 10 and 11.

To start the apparatus in operation, there are provided main Start and Stop push button switches 150 and 151, respectively, in series in conductor 152 for energizing relay 153. The Stop push button switch 151 is normally closed and the Start push button switch 150 is normally open, so that as soon as switch 150 is manually pressed, the relay 153 is energized to close its holding switch contacts 154 around the Start push button switch 150, and also to close its switch contacts 155 to supply energy from the conductor 146 to conductor 156.

In parallel with the relay 153 there may be connected a light 157 to indicate that the Start push button switch has been operated and the relay 153 is energized so that manual switches 160 and 170 may be operated. Also a manual switch 158 may be provided in this parallel circuit for connecting the light 157 to conductor 159 directly across conductors 146 and 147 to test if current is coming through the transformer 144.

Conductor 156 now supplies energy for the two two-way manual switches 160 and 170, the former closing the circuit through conductor 162 to energize relay 163 for starting the clean pump motor 131 by operation of its contacts 164 to start the circulation of the clean liquid from the reservoir 23 to the machine 15 or stations that require the clean liquid. This switch 160 will remain closed as long as it is operated. The other manual switch 170 is the one which starts the operation of the filtering and cleaning cycles of the suction filter apparatus of this invention.

According to FIG. 10, the circuit for the energization of the relay 171 for starting the suction pump motor 111 may be selectively predetermined by the operation of the manual selector switch 180 on the control panel 110, to be either through the vacuum switch 105 or through the float control switch 123, so that the timed cleaning cycle may be overruled by either a reduction in pressure in the intake line of the suction pump 111 to operate the vacuum switch 105 or by the reduction in the rate of output from the suction pump 111 to lower the float 124 to operate the switch 123. Therefore the circuit for energizing this relay 171 may be traced from the conductors 146 and 156 through now closed manual switch 170, conductor 176, either contact 177 of the vacuum switch 105 or contact 178 of the float switch 123, to the corresponding contacts 181 or 182, of the selector switch 180, and thence through common conductor 183, normally closed contacts of switch 184 of the clock cycle timer 185, conductor 186, normally closed switch 187 of the conveyor operating relay 191, and relay 171 to conductor 147. Simultaneously, with the energization of the relay 171 the clock timer 185 is also energized in parallel with the relay 171 through branch conductor 188 from switch 187. The clutch relay 189 of which this clock timer 185 is also simultaneously energized as soon as the push button 170 is operated through a direct circuit from conductor 176 through conductor 192, now normally closed contact 193 of relay 195, conductor 194, clutch relay 189 to conductor 147.

As soon as the adjustable pre-set timing cycle of the clock timer 185 runs out, the operation of the suction pump 111 is stopped and the clock timer 185 is reset by the opening of its switch 184 in its above traced energization circuit. This clock timer may be a 60 minute timer and its time is usually adjusted anywhere from 1 to 30 minutes. Simultaneously with the opening of its switch 184, the other switch 196 of timer 185 is closed to start the cleaning cycle by energizing the conveyor operating relay 191 to close its switch 197 to start the conveyor motor 81. The circuit for the energization of this relay 191 is traced through either contacts 181 or 182 from the vacuum or float control switch 105 or 124, respectively, conductor 183, now closed switch 196, still closed switch 198 of relay 195, conductor 199, now re-closed switch 201 of relay 171 (which was just closed by the de-energization of this relay 171 shutting off the suction pump motor 111), conductor 202, and relay 191 to conductors 147. Simultaneously with the energization of relay 191, the relay 195 is energized through a parallel circuit comprising conductors 203 and 204 from the just closed clock timer switch 196. This relay 195 immediately opens its switch 193 to de-energize the clutch relay of the clock timer 185, but delays the opening of its switches 198 and 205 (such as pneumatically) the pre-determined adjustable time for the cleaning cycle and operation of the conveyor 60. Accordingly, the conveyor motor operating relay 191 remains energized until this time expires, when the switch 198 opens to energize the conveyor motor control relay 191, switch 205 closes to re-energize the suction pump starting relay 171, from manual switch 170 and just closed switches 205 and 187. In the event the vacuum switch 105 or the float switch 123 operates during the cleaning cycle to break the circuit to the conveyor motor control relay 191, this relay also closes its holding switch 206 bridging the switches 105, 123 and 180 via conductor 207 until this relay 191 is de-energized by the opening of the delayed switch 198. Thus when relay 191 is re-energized it opens its own holding switch 206 which then de-energizes the relay 195 to open immediately and reset its delayed switches 198 and 206, and to close its switch 193 so as to give time for other switches to operate before the clutch relay 189 of the clock timer 185 is energized and the clock timer 185 restarted for the next timed filtering cycle.

Assuming now that the switch 180 is in the full line position shown in FIG. 10 so that the apparatus is under control of the vacuum switch 105, and that the vacuum switch 105 operates before the end of the timing cycle by the clock timer 185 or that this time clock is set for such a long cycle relative to the accumulation of particles or swarf on the screen 30 so as to be ineffective. Then switch 105 opens its contacts 177 and close its contacts 211 to break the circuit to the relay 171 to stop the suction pump motor 111 and to energize the circuit to the relays 191 and 195 through conductors 212, 207, 203 and 204 and the circuits previously described. Similarly now the cleaning cycle will continue as described above and its time must be preset so that when it is completed, the vacuum switch 105 will have reset into its full line position shown in FIG. 10 because the cleaning of the filter screen 30 by the conveyor scrapers 50 will usually have broken the vacuum sufficiently in the duct 103 to restore the pre-set operating pressure, thus re-setting the filtering cycle clock timer 185 re-energizing the suction pump motor relay 171 to start the suction pump motor 111. This vacuum switch 105 may be adjustable so that it can re-set at a different and lower pressure that it triggers to further insure its re-setting so that the timed filtering cycle may be restarted after each cleaning cycle.

Assuming now that the selector switch 180 has been switched to its dotted line position so that the apparatus is under the control of the float switch 123 and assuming that the flow rate from the suction pump 100 has decreased sufficiently to cause the float 124 to lower to open the contacts 178 of switch 123 and to close its contacts 215 before the expiration of the pre-set timed filter cycle. This then completes a circuit through now closed contacts 216 of switch 180 to conductor 207 to energize the conveyor operating relay 191 according to the above described circuits which stops the suction pump motor 111 by opening the circuit to the suction pump motor relay 171 and closing contacts 197 to start the conveyor motor 81 and the cleaning cycle which will continue as described above until it is completed. However, since the float 124 cannot return to its normal position to reoperate the switch 123 until after the suction pump 100 has been started and refilled the float chamber 120, switch 193 remains open after its delayed switches 198 and 205 have operated and until the relay 195 has been de-energized by the opening of the contacts 215 of the float switch 123. In the meantime only the relay 171 to start the pump is operated and the clock timer clutch relay 189 remains de-energized to prevent starting the timing cycle until after the contacts 215 are opened and the relay 195 is de-energized permitting its contacts 193 to close. Accordingly, the restarting of the filtering cycle is delayed after the end of the cleaning cycle, until the float 124 has returned to reoperate its sensing switch 123 into the full line position shown in FIG. 10. Thus in this case also, it is necessary that the pre-set time for the cleaning cycle is sufficiently long to permit enough cleaning of the screen 30 so that the flow rate from the pump 100 after it is restarted is sufficient to quickly refill the float chamber 120.

Referring now to the circuit diagram of FIG. 11 there is disclosed a control circuit for the apparatus of this invention, whereby both the vacuum and the float control switches 105 and 123, respectively, are connected in parallel with the cycle timer control switch 313, so that the cleaning cycle is controlled by any one of these three switches and either the float control switch 105 or vacuum control switch 123 can override the timing cycle depending upon which is the first to operate. Referring now to this circuit, its operation and disclosure from the top down to the manual switch 170 is the same as that described for the circuit of FIG. 10. The closing now of the self-holding manual switch 170 in this embodiment however now closes a circuit from conductors 146 and 156 through conductor 271, now and normally closed switch 272, conductors 273, normally closed switch 274, conductor 275, relay 276 to energize it, and conductor 277 to conductor 147. The energization of relay 276 closes its switch 278 to start the suction pump motor 111 to begin the filtering cycle. At this time also filtering cycle timer 280 is also energized from conductor 273 through conductors 281 and 282 to conductor 147. When the adjustable pre-set time on this cycle timer 280 runs out, it will operate its contact 284 to stop the suction pump 100 and start the cleaning conveyor 60. This sixty minute timer 280 usually may be adjusted to operate anywhere from 2 to 30 minutes after its starting, depending upon the time required to maintain a good filter bed 31 on the filter screen 30. The closing of this timer's contact 284 will supply energy from switch 170 through conductor 285, just closed switch 284, conductors 286 and 287 relay 290 to energize it, and conductors 288 and 289 to conductor 147. The energization of relay 290 closes its self-holding switch 291 closing its holding circuit from switch 170 through conductor 285 now and normally closed switch 313, conductor 293, just closed switch 291, conductors 294, 286 and 287, relay 290 and conductors 288 and 289 to conductor 147. Relay 290 also operates its switch 274 to open its contacts to conductor 275 to de-energize the relay 276 and stop the suction pump motor 111, and to close the other contacts of switch 274 to energize a circuit from conductor 273 through conductor 295, adjustable 10 second timer 300 to start it, and conductor 289 to conductor 147. The energization of timer 300 is pre-set for a time delay of a few seconds, say 3 to 5 seconds, to insure that the suction pump 100 has completely stopped and no more suction is applied to the filter screen 30, so the wipers 50 will not ride over any swarf 31 sucked tightly thereon. Timer 300 then opens previously closed contacts of switch 272 to re-set timer 280 to open contacts 284 and close its other contacts to connect energy from conductor 271 through said other contacts of switch 272, conductor 301, timer 310 to start it, and conductor 302 to conductor 147. Simultaneous with the energization of timer 310, relay 311 is energized in parallel therewith to close its switch 312 to start the conveyor motor 81 and thus initiate the cleaning cycle. After the pre-set adjustable time, usually between about 3 and 15 seconds, this timer 310 times out and opens its switch 313 which stops the conveyor motor 81 by de-energizing the relay 290 which in turn opens its switch 291 and operates its switch 274 back into its full-line position shown in FIG. 11 to de-energize and re-set the timer 300 which operates its switch 272 back into its full line position shown in FIG. 11 to de-energize the relay 311 to stop the conveyor motor 81 and to re-set the timer 310 and close its contacts 313. This re-operating of switches 272 and 274 re-energizes relay 276 to start the suction motor 111, and restarts the filtering cycle timer 180. This completes one time controlled filtering and cleaning cycle of the apparatus according to this circuit of FIG. 11.

Assume now that the suction has increased to such an extent as transmitted through the lead duct 103 and indicated on gauge 104 to operate the adjustable pre-set suction switch 105 in parallel with the timer switch 284 in FIG. 11 before the timer 280 has timed-out. Closure of this switch 105 overrules the operation of the timer 280 and its switch 284 to immediately complete the circuit for the energization of relay 290 which starts the timer 300, stops the suction pump motor 111, and after a short delay starts the timer 310 and the conveyor motor 81 to continue the operation of the cleaning cycle during which it is assumed the vacuum switch 105 will be reopened so relay 290 will be de-energized to stop the cleaning cycle and the timer 280 will be reset to start again the filtering cycle. If however, switch 105 is not then closed, the cleaning cycle is automatically repeated again to clean more of the screen 30 until the suction is decreased sufficiently to close the switch 105.

In parallel with the control switches 105 and 284 of the vacuum switch and timer, respectively, there also is shown in FIG. 11 switch 123 operated by the float 124 for starting up the same cleaning cycle of operations in the event the level in the float chamber 120 is decreased below a certain minimum to operate this switch 123, and also overrule the control of timer 280 by its switch 284. This system of operation, however, requires the addition of another switch 314 controlled by the cleaning cycle timer 310, which switch 314 is located in series with the float switch 123 and opens together with this timer's switch 313 at the end of its pre-set cycle time. This switch 314, however, is adjustably delayed for a few seconds in closing after the timer 310 is reset, in order to prevent the immediate repetition of the cleaning cycle because the float 124 has not had sufficient time to raise and open its switch 123 after the restarting of the suction pump motor to refill the float chamber 120. Thus, the delay in the response of the float switch 123 to the increase in the flow rate of the liquid after the cleaning cycle, is compensated for by this additional switch 314 which remains open a sufficient time to prevent the still closed and soon to be opened float switch 123 in series therewith, from immediately re-energizing the relay 290 and restarting the cleaning cycle when such is probably not necessary or desirable to continue the proper separation of particles from the liquid in the apparatus of this invention.

Accordingly there are three independent means provided for the automatic stopping of the suction pump motor 111 and the starting of the conveyor motor 81 to clean a given portion of the screen 30 to change automatically from the filtering to the cleaning cycle during the operation of the filter apparatus of this invention, and two of these means which control the switches 105 and 123 override and re-set the other means or switches 184 in FIG. 10 or switch 284 in FIG. 11 controlled by the timers 185 and 280, respectively.

The additional conveyor 95 provided in the reservoir 23 for cleaning out the settlings therein, if desired, may be driven independently and/or continuously by a separate motor (not shown) or it may be connected to the drive shaft 77 and operated intermittently and simultaneously with the conveyor 60 by the same motor 81 when it is energized according to either of the above described circuits.

If desired the suction filter apparatus of this invention may be employed together with other types of filtering apparatus, such as those disclosed in U.S. Patent No. 2,861,688, issued November 25, 1958, to Harold H. Harms and/or the "Backwash Filter System" disclosed in Harold H. Harms copending application Serial No. 753,244, filed August 5, 1958, now U.S. Patent No. 2,999,597, issued September 12, 1961.

While there is described above the principles of this invention in connection with specific apparatus, it is to be clearly understood that this description is made only by way of example and not as a limitation to the scope of this invention.

What is claimed is:

1. An apparatus for separating particles from a liquid, comprising:
    a filtering means having a filter screen,
    suction means to force said liquid through said screen,
    a reservoir for clean liquid removed from said filtering means,
    duct means for clean liquid between said filtering means and said reservoir,
    means for removing clean liquid from said reservoir,
    means to clean intermittently a part of said screen,
    means to stop said suction means for forcing liquid through said screen before and during the cleaning of said screen, and
    means connected to said duct means for controlling the operation of said cleaning means and said stopping means by the flow of liquid from said filtering means through said duct means and to said reservoir.

2. An apparatus according to claim 1 wherein said controlling means comprises a pressure responsive means connected to said duct means.

3. An apparatus according to claim 1 wherein said controlling means comprises a float suspended in said clean liquid from said duct means.

4. An apparatus according to claim 3 including a float chamber for said float connected to said duct means and separate from said reservoir.

5. An apparatus according to claim 4 including adjustable overflow means from said float chamber into said reservoir.

6. An apparatus according to claim 4 wherein said duct means from said suction means has a branch outlet connected to both said float chamber and said reservoir.

7. An apparatus according to claim 6 wherein the branch of said outlet to said reservoir includes a restriction to insure the filling of said float chamber before said reservoir.

8. A liquid purification system for separating particles from a liquid including a filtering cycle and a filter cleaning cycle,
    a filtering reservoir,
    a filtering means in said reservoir on which the particles form a filter coating during the filtering cycle,
    a filtrate collecting reservoir,
    a duct means connecting said reservoirs,
    suction pump means to continuously induce a flow of filtrate through said filtering means and said duct means into said filtrate collecting reservoir during the filtering cycle,
    means for removing at least a portion of the coating during the cleaning cycle, and
    means connected to said duct means responsive to a predetermined decrease in the flow of filtrate in said duct means for first stopping said pump means and then activating said coating removing means to initiate said cleaning cycle.

9. A system according to claim 8 including a weir overflow from said filtrate collecting reservoir into said filtering reservoir.

10. A system according to claim 8 including means for removing settled particles from said filtrate collecting reservoir.

11. A system according to claim 8 including a timing means connected to said removing means and said pump means for alternately intermittently operating said removing means and said pump means for predetermined intervals, said timing means being overruled by said means responsive to a predetermined decrease in flow of filtrate in said duct means.

12. A cleaning apparatus for separating particles from a liquid, comprising:
    a filtering chamber having a filtering means therein,
    means for introducing liquid to be cleaned into said filtering chamber,
    a reservoir separate from said filtering chamber for clean liquid sucked through said filtering means,
    duct means connected between said filtering chamber and said reservoir for said clean liquid,
    means in said duct means for sucking said liquid to be cleaned through said filtering means to build up a bed of particles on said filtering means,
    means for intermittently cleaning successive parts of said filtering means by removing a part of said bed,
    means for stopping said sucking means before and during the operation of said cleaning means,
    means for removing clean liquid from said reservoir, and
    means connected to said duct means for controlling the operation of said cleaning means and said stopping means in accordance with the flow of liquid through said filtering means and bed.

13. An apparatus according to claim 12 wherein said means for introducing liquid into said filtering chamber comprises a diffuser, and means for removing flotsam from the liquid in said filtering chamber.

14. An apparatus according to claim 13 including means for maintaining said diffuser on the surface of the liquid in said filtering chamber regardless of its change in level to reduce the formation of bubbles in said liquid and to direct said floatsam toward its removing means.

15. An apparatus according to claim 12 wherein said filtering means comprises a screen located at an angle to the horizontal in said filtering chamber to cause gases to accumulate at the upper end thereof, and means for connecting said duct means adjacent said upper end for the removal of said gases.

16. An apparatus according to claim 12 wherein said filtering means comprises a flat screen comprising parallel bars with downwardly diverging gaps between them.

17. An apparatus according to claim 12 wherein said filtering means comprises a plurality of sections, said filtering chamber includes means for replaceably mounting said sections, and means for sealing said sections to said mounting for preventing particles from passing around said sections instead of being stopped by said filtering means and said bed of particles built up thereon.

18. An apparatus according to claim 12 including a valve duct means connected to said means for removing clean liquid from said reservoir to rinse said filtering chamber below said filtering means.

19. An apparatus according to claim 12 wherein said filtering means comprises a screen, and wherein said cleaning means comprises a conveyor having flights which scrape over said screen.

20. An apparatus according to claim 19 wherein said flights are flexible to insure contact with the surface of said screen.

21. An apparatus according to claim 19 wherein said conveyor includes means for guiding said flights along said conveyor.

22. An apparatus according to claim 19 wherein said conveyor comprises a direction changing wheel at one end of said screen, and means for resiliently mounting said wheel for preventing the jamming of said conveyor by larger particles which may become wedged under said flights.

23. A filtering apparatus comprising:
- a first reservoir means for separating solid particles from a liquid,
- screening means adjacent the bottom of said first reservoir means on which particles settle to form a filter coating,
- a wiper conveyor movable over said screening means to remove said particles therefrom,
- a filtrate collecting chamber below said screening means, a second reservoir means,
- a duct means connecting said filtrate collecting chamber to said second reservoir means,
- means in said duct means to induce a flow of filtrate through said screening means and to transfer filtrate from said collecting chamber to said second reservoir means including a suction pump,
- timing means connected to said conveyor and said pump for alternately intermittently operating said conveyor and said pump for predetermined intervals, including
  - delay means for stopping said pump before starting said conveyor in order to break the vacuum created thereby, and
- means connected to said duct means responsive to changes in rate of filtrate flow through said screening means to over-rule said timing means.

24. A filtering apparatus comprising:
- a first reservoir means for separating solid particles from a liquid,
- filtering means in said first reservoir means on which particles are collected to form a filter coating,
- scraper means to remove intermittently a part of said coating,
- a filtrate collecting chamber below said filtering means,
- a second reservoir means adjacent and in connection with said first reservoir means,
- means for transferring filtrate from said collecting chamber to said second reservoir means, said means including:
  - a suction pump having intake means connected to said collecting chamber and discharge means connected to the bottom of said second reservoir means,
- a float chamber within said second reservoir means and connected to said discharge means,
- means to maintain the liquid level in said float chamber above that in said second reservoir means,
- a float in said float chamber, and
- timing means operated by said float and connected to said pump and said scraper means to control said pump and said scraper means whereby a reduction in the liquid level in said float chamber stops said pump and starts said scraper for a predetermined period of time to clean a part of said coating from said filtering means and thereby increase the flow of liquid through said filtering means.

25. An apparatus for separating particles from a liquid, comprising:
- a filtering means having a filter screen,
- means to force said liquid through said screen,
- a reservoir for clean liquid removed from said filtering means,
- duct means for clean liquid between said filtering means and said reservoir,
- means for removing clean liquid from said reservoir,
- means to clean intermittently a part of said screen,
- means to stop said means for forcing liquid through said screen at least during the cleaning of said screen, said stopping means including:
  - an adjustable resettable timer, and
- means connected to said duct means for controlling the operation of said cleaning means and said stopping means by the flow of liquid from said filtering means through said duct means into said reservoir.

26. An apparatus for separating particles from a liquid comprisnig:
- a filtering means having a filter screen,
- means to force said liquid through said screen,
- a reservoir for clean liquid removed from said filtering means,
- duct means for clean liquid between said filtering means and said reservoir,
- means for removing clean liquid from said reservoir,
- means to clean intermittently a part of said screen, including:
  - an adjustable resettable timer connected thereto for controlling the operation thereof,
- means to stop said means for forcing said liquid through said screen at least during the cleaning of said screen, and
- means connected to said duct means for controlling the operation of said cleaning means and said stopping means by the flow of liquid from said filtering means through said duct means into said reservoir.

27. An apparatus for separating particles from a liquid comprising:
- a filtering means having a filter screen,
- means to force said liquid through said screen,
- a reservoir for clean liquid removed from said filtering means,
- duct means for clean liquid between said filtering means and said reservoir,
- means for removing clean liquid from said reservoir,
- means to clean intermittently a part of said screen,
- means to stop said means for forcing liquid through said screen at least during the cleaning of said screen, and
- means connected to said duct means for controlling the operation of said cleaning means and said stopping means by the flow of liquid from said filtering means through said duct means into said reservoir, said controlling means including:
  - a delay means for operating said cleaning means only a predetermined time after the stopping means has been operated in order to be sure that the effect of said forcing means on the particles collected on said filter screen has been completely released before said cleaning means operates.

28. A liquid purification system for separating particles from a liquid including a filtering cycle and a cleaning cycle,
- a filtering reservoir provided with screening means on which the particles form a filter coating during the filtering cycle,
- a filtrate collecting reservoir,
- a duct means connecting said reservoirs,
- pump means to continuously induce a flow of filtrate through said screening means and said duct means into said filtrate collecting reservoir during the filtering cycle,
- scraper means for removing at least a portion of the coating from the screening means during the cleaning cycle, and
- means connected to said duct means responsive to a predetermined decrease in the flow of filtrate in said duct means for stopping said pump means and activiating said scraper means to initiate said cleaning cycle, said responsive means including:

means for delaying the activating of said scraper means a predetermined time after the stopping of said pump means.

References Cited by the Examiner
UNITED STATES PATENTS

| | | | |
|---|---|---|---|
| 2,183,578 | 12/39 | McNeal | 210—140 |
| 2,366,903 | 1/45 | Harms et al. | 210—108 |
| 2,861,688 | 11/58 | Harms | 210—408 |
| 2,867,324 | 1/59 | Hirs | 210—97 |
| 2,867,327 | 1/59 | Hirs | 210—106 |
| 3,087,620 | 4/63 | Hirs | 210—111 |
| 3,091,336 | 5/63 | Hirs | 210—111 |

REUBEN FRIEDMAN, *Primary Examiner.*

HERBERT L. MARTIN, *Examiner.*